United States Patent [19]
Billings

[11] Patent Number: 5,737,422
[45] Date of Patent: Apr. 7, 1998

[54] DISTRIBUTED DATA PROCESSING NETWORK

[76] Inventor: Roger E. Billings, 26900 E. Pink Hill Rd., Independence, Mo. 64057-3294

[21] Appl. No.: 430,942

[22] Filed: Apr. 26, 1995

[51] Int. Cl.$^6$ .................................................. H04L 9/00
[52] U.S. Cl. .................................................. 380/25
[58] Field of Search .................................................. 380/25

[56] References Cited

U.S. PATENT DOCUMENTS

| | | | |
|---|---|---|---|
| 4,112,369 | 9/1978 | Forman et al. | 380/25 |
| 4,609,777 | 9/1986 | Cargile | 380/25 |
| 4,757,539 | 7/1988 | Matyas et al. | 380/25 |
| 4,800,590 | 1/1989 | Vaughn | 380/25 |
| 5,091,939 | 2/1992 | Cole et al. | 380/25 |
| 5,210,795 | 5/1993 | Lipner et al. | 380/25 |
| 5,241,599 | 8/1993 | Bellovin et al. | 380/21 |
| 5,418,854 | 5/1995 | Kaufman et al. | 380/25 |
| 5,434,918 | 7/1995 | Kung et al. | 380/25 |
| 5,455,953 | 10/1995 | Russell | 380/25 |
| 5,479,512 | 12/1995 | Weiss | 380/25 |
| 5,481,612 | 1/1996 | Campana et al. | 380/25 |
| 5,491,752 | 2/1996 | Kaufman et al. | 380/2 |
| 5,497,421 | 3/1996 | Kaufman et al. | 380/25 |

*Primary Examiner*—Salvatore Cangialosi
*Attorney, Agent, or Firm*—Hovey, Williams, Timmons & Collins

[57] ABSTRACT

A distributed data processing network including a method and apparatus for sending secured data between a plurality of computers is disclosed. The distributed data processing network preferably includes a server computer, a plurality of user computers, a communication network coupling the server computer with the user computers, and a plurality of security circuits. The security circuits each include a clock circuit, a linear feedback shift register, a data encrypter/decrypter, and a password randomizer that cooperate for sending secured data between the server computer and any one of the user computers without sending the user's password to be sent over the network communication path.

18 Claims, 3 Drawing Sheets

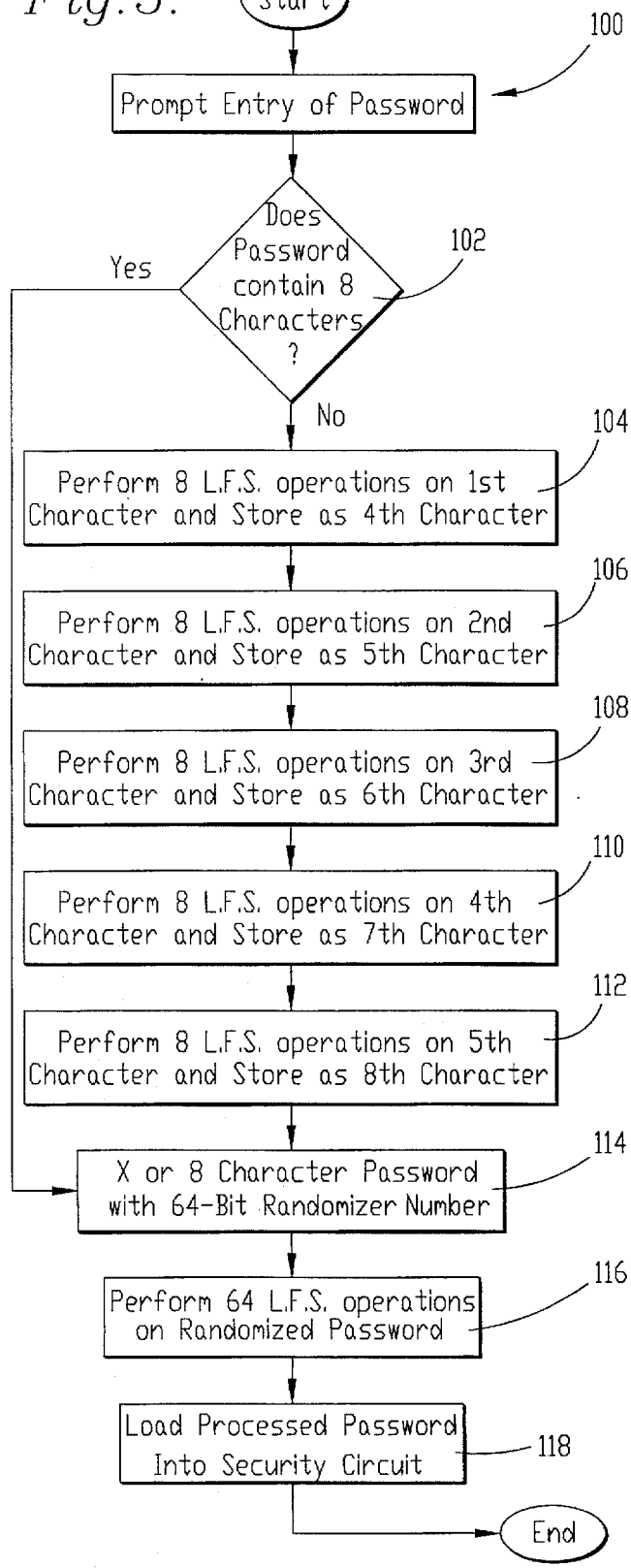

DISTRIBUTED DATA PROCESSING NETWORK

BACKGROUND OF THE INVENTION

1. Field of the Invention

The present invention relates to distributed data processing networks, and more particularly to a method and apparatus for requesting and sending secured data over a distributed data processing network without sending the user's password over the network communication path.

2. Description of the Prior Art

Conventional distributed data processing networks include a central file server computer coupled with a plurality of user computers or workstation computers by a communication network such as a local area or wide area network. Distributed data processing networks have become more prevalent in recent years due to their adaptability, speed and efficiency.

As distributed data processing networks are used for larger and more sophisticated applications, improved data security is becoming more important. Prior art attempts to provide data security in distributed data processing networks have had limited success because the security methods can be circumvented. In prior art networks, data is stored in the central data server computer and is retrieved when a user of a user computer transmits a data request to the server computer over the network path. The log-on portion of the data request includes the user's password and identification number. The central computer receives the data request, verifies the password and transmits the data to the user computer only if the password is correct.

These prior art security methods can be circumvented because the user's password must be transmitted over the network communication path. The transmitted password can then be picked off and copied by a computer hacker who gains access to the network. Once the computer hacker has copied the password, he or she can use it to gain access to the legitimate user's secured files without being detected.

Dr. Roger E. Billings, the applicant of the present invention, has developed a distributed data processing system that more quickly retrieves data from the server computer. The distributed data processing system includes a second network path independent of the primary network path. The server computer periodically sends commonly requested data to all of the user computers simultaneously over the second network path in broadcast fashion. This reduces the number of data requests on the primary network communication path and thus significantly increases the speed and capacity of the network. This invention is the subject of pending U.S. patent application Ser. No. 08/338,682, entitled DISTRIBUTED DATA PROCESSING SYSTEM now U.S. Pat No. 5,684,956. Although this system is faster and more efficient than prior art networks, data security is still limited because the user must send a data request over the primary network path if he or she wishes to retrieve secured data that is not broadcast. As with prior art distributed data processing networks, the log-on portion of the data request always includes the user's password, though often encrypted.

Accordingly, there is a need for an improved distributed data processing network that overcomes the limitations of the prior art. More particularly, there is a need for a distributed data processing network that includes a method and apparatus for sending secured data from the server computer to a user computer without requiring the user's password to be sent over the network communication path.

OBJECTS AND SUMMARY OF THE INVENTION

The present invention overcomes the problems outlined above and provides a distributed data processing network with an improved data security protocol. More particularly, the present invention provides a distributed data processing network including a method and apparatus for sending secured data between a server computer and a workstation or user computer without sending the user's password over the network communication path.

The distributed data processing network of the present invention broadly includes a server computer, a plurality of user computers, a communication network coupling the server computer with the user computers, and a plurality of security circuits. A separate but identical security circuit is coupled with each network interface card provided with the server computer and the user computers. The security circuit of the server computer and a security circuit of any one of the user computers cooperate for sending secured data between the server computer and the user computer without sending the user's password over the network communication path.

In more detail, the server computer is preferably a data server type microcomputer such as an IBM compatible computer having an Intel Pentium microprocessor. The server computer includes means for storing and sending data and means for receiving and storing the passwords of all the users of the network.

The user computers are also preferably conventional microcomputers such as IBM compatible computers having Intel Pentium microprocessors; however, they may also include multi-user computers with "dumb" terminals having communication capabilities only. The user computers include means for requesting and receiving data from the server computer and means for receiving a user's password and identification name or number.

The communication network couples the server computer with the user computers for providing data communication therebetween. The communication network may include any conventional network such as a local area network, a wide area network, or a telecommunication network.

The security circuits cooperate for sending secured data between the server computer and any one of the user computers without requiring the user's password to be sent over the network communication path. Each security circuit broadly includes a clock circuit, a linear feedback shift register, a data encrypter/decrypter, and a password randomizer. The components of the security circuit are preferably programmed in a field programmable gate array logic circuit; however, those skilled in the art will appreciate that the security circuit may also be formed with conventional solid-state logic components. Additionally, the functions of the security circuit can also be performed entirely in software stored in the memory of the server computer and the user computers.

To authorize a user to access secure files stored in the server computer, the user's password and ID must first be entered into a password database stored on the hard drive of the server computer. The server computer initially randomizes and replicates the passwords to ensure that they are of sufficient length and contain characters that would not normally be used in a password. These randomization and replication steps are normally performed in a computer program stored in the memory of the server computer.

To receive secured data from the server computer, a user enters his or her user ID and password into any one of the user computers. The user computer includes software that initially randomizes and replicates the password in the same way as described above so that the server computer and the user computer receive the same password. The user computer then sends a data request including the user's ID to the server computer. The data request does not include the user's password.

Once the server computer receives the data request, the security circuit coupled with the server computer retrieves the user's password from the password database and encrypts the requested data by using the password as an initial encryption key. The security circuit also scrambles the loaded password with a 248-bit randomizer number after each clock cycle using a novel randomizer to eliminate data patterns in the encrypted data. Finally, the security circuit performs a linear feedback shift operation on the entire randomized password to provide further randomizing. The security circuit then sends the encrypted data from the server computer to the user computer over the communication network.

The security circuit coupled with the corresponding user computer receives the encrypted data and decrypts it by using the user's password entered in the user computer as an initial decryption key. The user computer security circuit performs the exact same steps as the server computer security circuit did to encrypt the data so that the data is retrieved in its original form.

The above described distributed data processing network provides distinct advantages over prior art distributed data processing networks. For example, since secured data can be sent between the server computer and any user computer without sending the user's password over the communication network, the user's password cannot be picked off and copied by a computer hacker. This significantly increases the security of the distributed data processing network and allows highly confidential or otherwise sensitive information to be transmitted over the network.

Additionally, since security circuits are provided at the user computers as well as the server computer, the method allows secured data to be sent from a user computer to the server computer, among a plurality of computer users, or among several server computers in an enterprise network system. For example, a network supervisor can update or add additional passwords to a server computer from a user computer by encrypting the updated or new passwords using his or her own password as an encryption key. The server computer which already has the network supervisor's password in its database, can then decrypt the data and retrieve the updated or new passwords and add them to the password database.

Another advantage of the invention is that by providing a security circuit that: 1) receives a randomized and replicated password at its input, 2) encrypts the secured data with the randomized and replicated password, 3) randomizes the password with a 248-bit randomizer number after each clock pulse, and 4) performs a linear feedback shift operation on the entire randomized password after each clock cycle, a highly secured data packet is formed. By encrypting and decrypting a packet of data as described herein, $2^{64}-1$ different values are used to encrypt the data. If a computer hacker attempts to decode the encrypted data packets using a supercomputer that operates at a speed of one million keys per second, it would take over 292,000 years to attempt half of the possible key combinations to decode the encrypted data packets.

Finally, since the security circuits coupled with the server computer and the user computers perform all of the encryption and decryption steps, the CPUs of the server computer and user computers are not burdened with security functions. This increases the speed and efficiency of the network.

BRIEF DESCRIPTION OF THE DRAWING FIGURES

A preferred embodiment of the present invention is described in detail below with reference to the attached drawing figures, wherein:

FIG. 4a is logic table illustrating the encryption of an exemplary byte of data using an exemplary password;

FIG. 4b is logic table illustrating the decryption of an exemplary byte of encrypted data;

FIG. 5 is a flow chart illustrating the preferred method of replicating and randomizing a user's password.

DETAILED DESCRIPTION OF THE PREFERRED EMBODIMENTS

Figure 1:
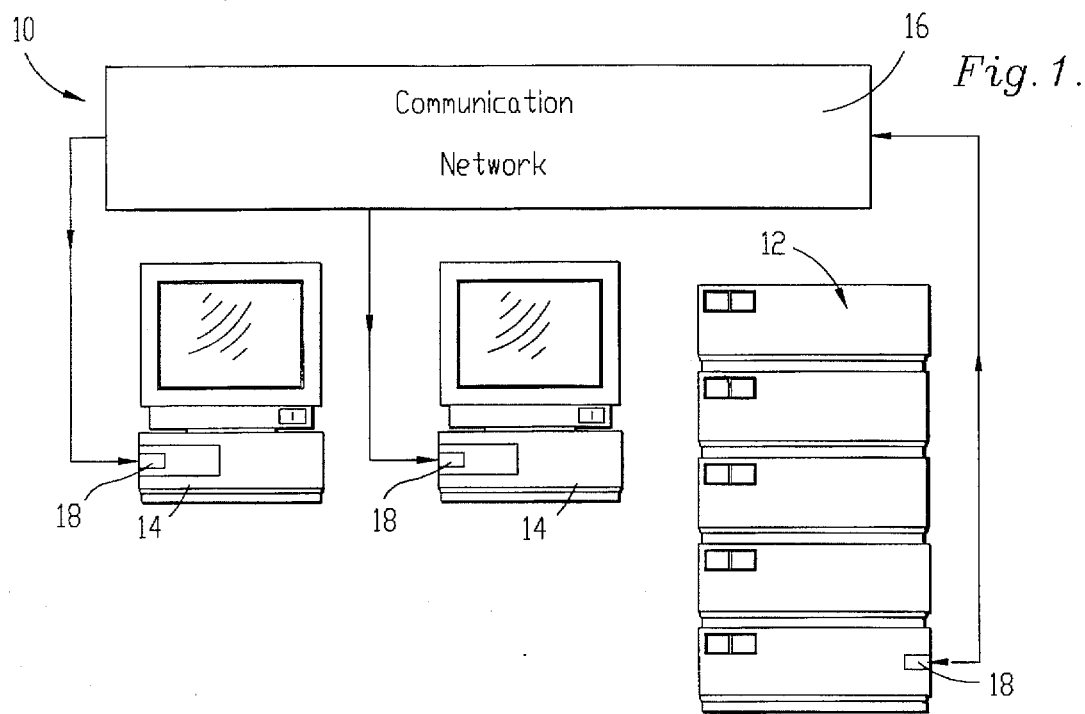
FIG. 1 is a schematic representation of a distributed data processing network constructed in accordance with a preferred embodiment of the invention.

Turning now to FIG. 1, distributed data processing network 10 constructed in accordance with the preferred embodiment is illustrated. The preferred distributed data processing network broadly includes server computer 12, a plurality of user computers 14, communication network 16 for coupling server computer 12 with user computers 14, and a plurality of security circuits 18. As described in more detail below, a separate but identical security circuit 18 is coupled with the network interface cards of server computer 12 and each user computer 14. Security circuits 18 cooperate for sending secured data between server computer 12 and user computers 14 without sending the user's password over network 16.

In more detail, server computer 12 is preferably a data server type computer such as an IBM compatible microcomputer having an Intel Pentium microprocessor. Server computer 12 includes conventional memory for storing and sending data and memory for receiving and storing the passwords of a plurality of users. Server computer 12 also includes one or more network interface card installed in its expansion slots for converting the computer into a networked data server computer.

User Computers 14 are preferably conventional computers such as IBM compatible microcomputers having Intel Pentium microprocessors; however, they may also include multi-user computers with "dumb" terminals having communication capabilities only or computers based on other industry standards. Each user computer 14 includes conventional memory, video monitor and various other peripherals. Each user computer 14 also includes one or more network interface cards installed in its expansion slots for converting the computer into a networked computer.

Communication network 16 couples server computer 12 with user computers 14 for providing data communication therebetween. Communication network 16 can be any conventional network including a local area network, a wide area network, or a telecommunication network. Communication network 16 may also include an independent second network path for periodically transmitting commonly requested data from server computer 12 simultaneously to all user computers 14 in broadcast fashion.

Security circuits 18 are provided for sending secured data between server computer 12 and any one of user computers 14 without requiring the user's password to be sent over communication network 16. As illustrated in FIG. 1, a separate but identical security circuit 18 is coupled individually with server computer 12 and each user computer 14. Security circuits 18 are preferably coupled with their respective network interface cards in the expansion slots of server computer 12 and user computers 14.

Figure 2:
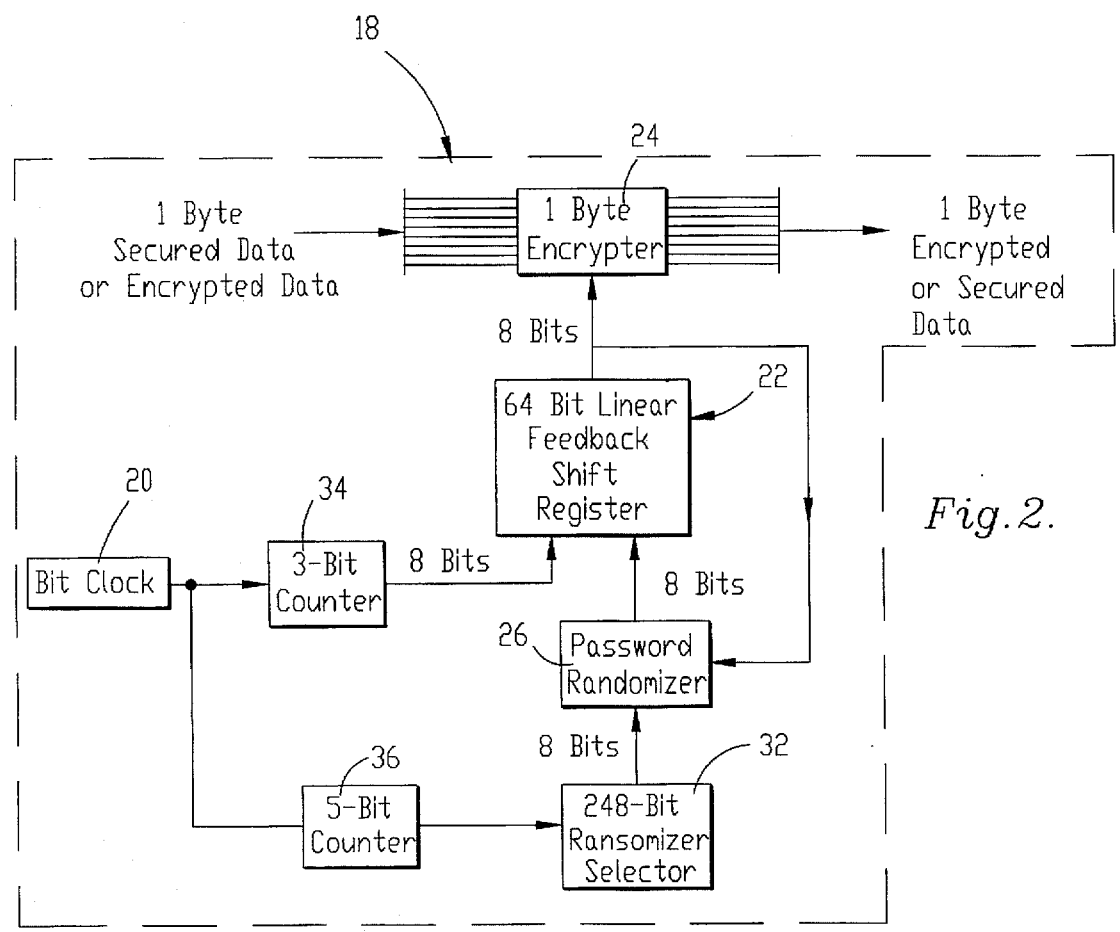
FIG. 2 is a block diagram of the components of a security circuit.

As illustrated in FIG. 2, in the preferred embodiment of the invention, each security circuit 18 may include clock circuit 20, linear feedback shift register 22, data encrypter/decrypter 24, and password randomizer 26. Security circuit 18 preferably processes 64-bit user passwords and 64-bit data packets one byte per clock cycle; however, for simplicity, an 8-bit security circuit for handling an 8-bit password is illustrated. Those skilled in the art will appreciate that security circuit 18 an be modified to handle any size password.

The individual components of each security circuit 18, namely clock circuit 20, linear feedback shift register 22, data encrypter/decrypter 24, and password randomizer 26, are preferably programmed in a field programmable gate array logic circuit such as those manufactured by Cypress Semiconductor. Those skilled in the art will appreciate security circuit 18 may also be formed with conventional solid state logic components wired to a PC board. Additionally, the functions of the security circuit can also be performed entirely in software stored in the memory of the server computer and the user computers.

Clock circuit 20 provides timing to the remaining components of security circuit 18. Preferably, one byte of data is encrypted or decrypted per clock pulse.

Figure 3:
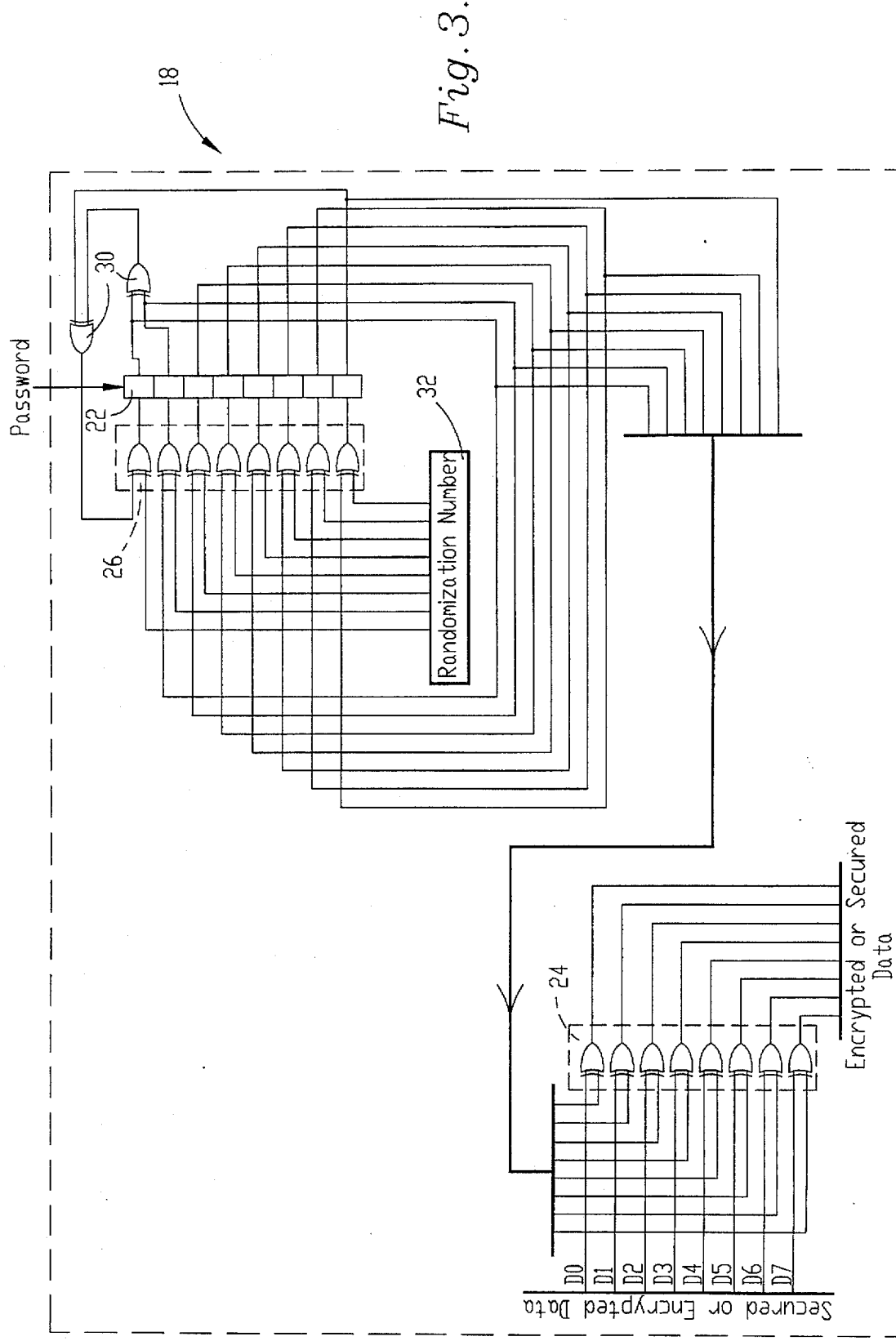
FIG. 3 is a circuit diagram of the key components of a security circuit.

Linear feedback shift register 22 stores a user's password for use in encrypting requested data. As illustrated in FIG. 3, linear feedback shift register 22 includes a password register and a series of tap points.

The password register operates like a conventional 64-bit shift register and receives a user's password from the password database of server computer 12 after it has been replicated and randomized as described below. Each output bit of the password register is coupled with the inputs of data encrypter/decrypter 24 and password randomizer 26.

The tap points of linear feedback shift register 22 are coupled with a series of XOR gates 30. The output of XOR gates 30 is inserted into the trailing end of the password register after it has shifted after each clock pulse. This randomizes the password to prevent data patterns in the encrypted data.

Data encrypter/decrypter 24 encrypts requested data before it is transmitted over communication network 16. As illustrated in FIG. 3, data encrypter/decrypter 24 includes a plurality of conventional XOR logic gates. Each logic gate receives one bit of the requested data from the memory of server computer 12 and one bit of the password from the output of the password register of linear feedback shift register 22. Each logic gate of encrypter/decrypter 24 XORs the requested data with the password to encrypt the data.

Password randomizer 26 is provided for further randomizing the password to eliminate data patterns that could form in the encrypted data if the same password were continually XORed with the requested data. As illustrated in FIG. 3, password randomizer 26 includes a 248-bit randomizer selector 32 and a plurality of XOR logic gates.

Randomization selector 32 stores a 248-bit randomizer number. The randomizer number is "burnt in" randomizer selector 32 and is kept secret so that a computer hacker cannot copy it. As described below, this makes it nearly impossible to decode a series of encrypted data packets without using security circuit 18.

Password randomizer 26 also includes a plurality of XOR logic gates. Each logic gate receives one bit from the output of the password register of linear feedback shift register 22 and one bit from the 248-bit randomizer selector 32. The logic gates XOR the output of the password register with one byte of the randomizer number and delivers their outputs to the inputs of the password register. In this way, the contents of the password register are continuously randomized with each clock pulse to eliminate any data patterns in the encrypted data.

A 3-bit counter 34 is coupled between clock circuit 20 and linear feedback shift register 22 for determining which byte of the password is to be delivered to encrypter/decrypter 24 and to password randomizer 26. A 5-bit counter 36 is coupled between clock circuit 20 and randomizer selector 32 for determining which byte of the 248-bit randomization number is to be delivered to password randomizer 26.

Since a 64 bit password (even number of bytes) is randomized in password randomizer 26 with a 248-bit randomizer number (odd number of bytes), the bytes of the password are not repetitively randomized with the same bytes of the randomizer number. This provides a much higher level of randomization than if a randomizer with an even number of bytes were used.

In operation, security circuit 18 coupled with server computer 12 and security circuit 18 coupled with any user computer 14 cooperate for sending data over communication network 16 without sending the user's password over network 16. Each security circuit 18 performs the following operations to either encrypt or decrypt secured data:

1) Security circuit 18 first receives a randomized and replicated password from either server computer 12 password database or from user computer 14 and stores it in linear feedback shift register 22;

2) the randomizer XOR encrypter randomizes the password one byte at a time with a 248-bit randomizer number;

3) the encrypter/decrypter 24 receives the first byte of secured data from server computer 12 or one byte of encrypted data from network 16 and XORs the data with the first byte of the randomized password stored in linear feedback shift register 22; and 4) the password register performs a linear feedback shift operation on the entire randomized password.

Steps 2–4 are repeated for each byte of secured data to be transmitted or for each byte of encrypted data to be decrypted. By encrypting and decrypting a packet of data as described herein, $2^{64}-1$ different encryption values are used. If a computer hacker attempted to decode the encrypted data packets using a supercomputer that operates at a speed of one million keys per second, it would take over 292,000 years to attempt half of the possible key combinations to decode the encrypted data packets.

To authorize a user to access secure files stored in server computer 12, the user's password and ID must first be entered into a password database stored on the hard drive of server computer 12. To ensure that the password is sufficiently long and random, it is initially processed before being loaded into the password database. The initial password processing is performed by a computer program that is preferably written in C or assembly language and stored in the memory of both server computer 12 and user computers 14.

FIG. 5 illustrates the steps of the password processing computer program. The program begins at step 100 which prompts the user or the network administrator to enter the user's password. Step 102 then determines whether the password contains 8 characters (or 64-bits) of information. If the answer to step 102 is yes, the program proceeds to step 114 of the program. If the answer to step 102 is no, the program moves to step 104.

Steps 104–112 replicate the password to obtain a password with 64 bits of information. The steps illustrated replicate a 3 character password to obtain an 8 character password. Those skilled in the art will appreciate that the steps can be easily modified so that passwords containing other numbers of characters can be replicated to obtain an 8 character password. Step 104 performs 8 linear feedback shift operations on the first character of the password and stores the results as the fourth character of the password. Step 106 then performs 8 linear feedback shift operations on the second character of the password and stores the results as the fifth character of the password.

Step 108 then performs 8 linear feedback shift operations on the third character of the password and stores the results as the sixth character of the password. Step 110 then performs 8 linear feedback shift operations on the fourth character of the password and stores the results as the seventh character of the password.

Step 112 then performs 8 linear feedback shift operations on the fifth character of the password and stores the results as the eighth character of the password.

The program next proceeds to step 114 where the entire 8 character password is XORed with a random 64-bit number stored in the computer program. Any random number can be used. Step 116 then performs 64 linear feedback shift operations on the randomized 8 character password to further randomize the password.

Finally, step 118 sends the replicated and randomized password to security circuit 18 of either server computer 12 or user computers 14 for use as an initial key for encrypting the requested data or for decrypting the data after it has been sent over network 16.

To receive data from server computer 12, a user enters his or her user ID and password into any one of user computers 14. User Computer 14 initially randomizes and replicates the password in the same way as described above so that server computer 12 and user computer 14 receive the same password. User computer 14 then sends a data request including the user's ID to server computer 12. The data request does not include the user's password.

Once server computer 12 receives the data request, security circuit 18 coupled with server computer 12 retrieves the user's password from the password database and encrypts the requested data by using the password as an initial encryption key. Security circuit 18 also scrambles the loaded password with a 248-bit randomizer number to eliminate data patterns in the encrypted data. Finally, security circuit 18 performs a linear feedback shift operation of the entire randomized password to provide further randomizing. Security circuit 18 then sends the encrypted data from server computer 12 to user computer 14 over communication network 16.

Security circuit 18 coupled with user computer 14 receives the encrypted data and decrypts it by using the user's password entered in the user computer as an initial decryption key. The security circuit 18 coupled with user computer 14 performs the exact same steps as the security circuit coupled with server computer 12 so that the data is retrieved in its original form. Those skilled in the art will appreciate that as long as the same password and randomization number are used by each security circuit 18, encrypted data can be retrieved by performing the identical steps to decrypt the data.

FIG. 4a illustrates the encryption of an exemplary byte of data and password by security circuit 18 coupled with server computer 12. FIG. 4b illustrates the decryption of an exemplary byte of encrypted data and password by security circuit 18 coupled with any one of user computers 14.

Although the invention has been described with reference to the preferred embodiment illustrated in the attached drawing figures, it is noted that equivalents may be employed and substitutions made herein without departing from the scope of the invention as recited in the claims. For example, although the preferred security circuits are programmed in field programmable gate arrays, they may also be formed with other technologies including conventional solid state logic devices. Additionally, although the security circuits described process 64-bit passwords and 248-bit randomizer values, the circuitry can be modified to handle any size password and randomizer.

Having thus described the preferred embodiment of the invention, what is claimed as new and desired to be protected by Letters Patent includes the following:

I claim:

1. A method of sending secured data between a data server computer and a user computer coupled together by a communication network comprising the steps:

storing a randomized version of a user's password and an identifier in the data server computer;

receiving into the data server computer a data request from a user of the user computer, the data request including the user's identifier but not including the user's randomized password;

encrypting the requested data at the data server computer using the user's randomized password stored in the data server computer as an encryption key to produce encrypted data;

sending the encrypted data to the user computer; and decrypting the encrypted data at the user computer using the user's randomized password as a decryption key, whereby secured data is sent between the data server computer and the user computer without sending the user's password over the communication network and without sending any encrypted variation of the user's password over the communication network.

2. The method as set forth in claim 1, further including the steps of encrypting data at the user computer using the user's randomized password as an encryption key, sending the encrypted data to the server computer, decrypting the encrypted data at the server computer using the user's randomized password stored in the data server computer as a decryption key, and storing the decrypted data in the server computer.

3. The method as set forth in claim 1, further including the steps of encrypting data at the user computer, sending the encrypted data to a second user computer coupled with said user computer by said communication network, and decrypting the encrypted data at the second user computer.

4. The method as set forth in claim 1, including the step of adding new user passwords to said data server computer by encrypting the new user passwords with a known user randomized password and sending the encrypted user passwords to said data server computer for decrypting using the known user randomized password as a decryption key.

5. The method as set forth in claim 1, said communication network including a local area network.

6. The method as set forth in claim 1, said communication network including a wide area network.

7. The method as set forth in claim 1, said communication network including a telecommunication network.

8. The method as set forth in claim 1, said data server computer including a mainframe computer.

9. The method as set forth in claim 1, said data server computer including a minicomputer.

10. The method as set forth in claim 1, said data server computer including a microcomputer.

11. The method as set forth in claim 1, said user computer including a microcomputer.

12. A security circuit for sending secured data between a data server computer and a user computer coupled together by a communication network without sending the user's password over the communication network, said security circuit including:

encrypting means, including means for coupling with said data server computer, for encrypting data to be sent from the data server computer to the user computer using the user's randomized password as an encryption key; and decrypting means, including means for coupling with said user computer, for receiving the encrypted data sent by said data server computer and for decrypting the encrypted data using the user's randomized password as a decryption key, whereby data is sent between the data server computer and the user computer without sending the user's password over the communication network and without sending any encrypted variation of the user's password over the communication network.

13. A distributed data processing system for use with a communication network, said system including:

a data server computer including means for storing data, a user's randomized password, and a user's identifier, and means for receiving data requests containing a user's identifier and for sending data in response thereto; and a user computer including means for receiving a user's password and identifier means for randomizing said user's password, and means for requesting and receiving data from said data server computer, said data server computer including encrypting means for retrieving a user's randomized password in response to a data request from said user computer, for encrypting the requested data using the user's randomized password as an encryption key, and for sending the encrypted data to said user computer, said user computer including decrypting means for receiving the encrypted data sent by said data server computer and for decrypting the encrypted data using the user's randomized password as a decryption key, whereby data is sent between the data server computer and the user computer without sending the user's password over the communication network and without sending any encrypted variation of the user's password over the communication network.

14. The distributed data processing system as set forth in claim 13, said user computer including encrypting means for encrypting data using the user's randomized password as an encryption key and for sending the encrypted data to said server computer.

15. The distributed data processing system as set forth in claim 14, said server computer including decrypting means for decrypting the encrypted data sent by said user computer using the user's randomized password as a decryption key.

16. The distributed data processing system as set forth in claim 13, said server computer including a minicomputer.

17. The distributed data processing system as set forth in claim 14, said server computer including a microcomputer.

18. The distributed data processing system as set forth in claim 14, said user computer including a microcomputer.

* * * * *